UNITED STATES PATENT OFFICE.

LOUIS MARIE FRANÇOIS BRETONNIÈRE, OF LAVAL, FRANCE, ASSIGNOR TO HIMSELF AND EDWARD CROISSANT, OF SAME PLACE.

IMPROVEMENT IN PRODUCING COLORING MATTER FROM VEGETABLE SUBSTANCES.

Specification forming part of Letters Patent No. 142,892, dated September 16, 1873; application filed May 15, 1873.

*To all whom it may concern:*

Be it known that I, L. MARIE FRANÇOIS BRETONNIÈRE, of Laval, in the Republic of France, have invented an Improved Process of Obtaining Coloring Matters from Vegetable Substances, of which the following is a specification:

This invention relates to a new manner of treating organic bodies with alkaline sulphurets and persulphurets at a temperature varying between 100° and 310° centigrade, according to the nature of the substances to be treated and the shade to be obtained, so as thereby to transform them into coloring matter.

The organic substances to be transformed by my method into coloring matter are put directly—that is to say, without any intervening or preparatory steps, and without any previous transformation, in the shape in which they may originally be—into contact with the dissolved sulphurets or persulphurets, at a temperature properly regulated, and are thereby transformed into definite products, resulting from the chemical combinations.

The shade of these coloring substances may vary, according to the condition or details of process, which may be determined by the operator.

The combination thus developed constitutes an organic sulphide, the products obtained by my process being really the result of a true combination, so that this combination may be determined by the result. If, for instance, sawdust is mixed with a solution of the sulphuret of potash and the temperature is raised, an abundant disengagement of sulphureted hydrogen will be noticed until the temperature has reached about 300°. The alkaline sulphuret is in this way decomposed. A part of its mass combines with the hydrogen of the organic body, and the carbon which remains will be found in a state of separate combination.

The substances so treated will be changed into coloring matter of great power, all, however, completely and easily soluble in water.

It may here be remarked that the same materials will produce different shades, according to the degree of temperature, duration of the operation, and proportion of the sulphurets employed, and that, as a general rule, the product will approach a black tint, and its solubility will be greatest, if the temperature is very high and the duration of the boiling prolonged. A reaction may also be produced at the regular boiling-point; if, for example, extract of chestnut-wood is added, and the simple mixture of the liquid sulphurets with such extract is dissolved in water, which will suffice to disengage the hydrogen, while other substances, such as sawdust, humus, &c., will require a temperature of 200°, or more, for the reaction to take place.

Among the numerous organic bodies which may, by my process, be changed into coloring materials, I will mention the following, with which I have experimented, and always with success: Sawdust, humus, and vegetable matter; the lichens and mosses, bran, flour, gluten, starch, fecula, sugar, glucose, cellulose, waste paper, cotton, &c.; tannic and gallic acids, gelatine, caseine, fibrine, albumine, blood, horn, feathers, &c., as well as animal excretions, chimney-soot, tartaric, citric, and formic acids, &c., as well as their alkaline salts; rosin, galipot, aloe, pock-wood, dragon's blood, &c.; purified gum-lac, gum-dragon, gum-arabic, &c. In fact, most, if not all, organic bodies may be treated by my process.

From the preceding description it will appear that by this process an almost indefinite series of new coloring products can be obtained, giving the greatest variety of shades by the aid of substances which are very abundant in nature, and which, in comparison with the importance of the result, are almost of no real value, the reaction or combination being obtained by the simple boiling of these substances with the alkaline sulphurets or persulphurets—that is to say, with substances abundant and cheap.

One of the characteristic distinctions of my process is, that the substances which are employed are for the greater part not in themselves coloring materials, but that they will, when directly acted upon by alkaline sulphurets, or their elements, be transformed into new and absolute coloring products. This process is not only applicable to the production of new coloring matter from organic substances possessing no coloring qualities, but also to increase the effectiveness of soluble coloring matter already used in dyeing by treating the same with certain substances, and thereby modifying or enhancing their qualities.

In this way logwood, chestnut-wood, pockwood, sandal-wood, &c., powdered or in form of extract, catechu, madder, waste powder of madder, previously boiled, fustet, annotto, &c., may be treated. In modifying their composition, new properties may be imparted to these substances. The colors treated upon by my method, being conveniently made separate, or, by mixture into an intense black, into gray of all sorts, violet, yellow, maroon, or other brown, corn color, olive color, &c., and fixed to the tissues by the bichromate of potash, for example, enjoy frequently a remarkable stability against the influence of air, acids, alkalines, or soap. They may, moreover, be modified in a suitable manner, according to the mordants used in fixing them to the fibers.

I will now more fully describe my new process, explain its advantages, and its effect upon industrial transactions, and it will be observed that the process is very simple, cheap, and readily put into practice.

The degree of temperature, duration of operation, and the proportions of the materials used, will vary indefinitely, in accordance with the materials to be treated and the shades to be produced. In every case, however, whatever the substance to be treated, the essential features of the process remain the same, and its simplicity renders its application very easy. It is not possible to give the exact quantities and formulas for each shade that can be produced on this new plan, with the several organic materials that can thereby be changed into coloring matter.

Knowing, as has already been stated, that the more the temperature is raised, the nearer the shade produced will approach the black, or at least a very deep color, it is for the operators to vary the proportions and temperature, so as to obtain the desired result.

I will, however, indicate some results, and lay down some rules, which may serve as a guide, as the general mode of treatment will be the same in all cases. As the combination does not require but little heat—as, for example, in treating aloes—the substance may be boiled in large kettles. If then, say, three grammes of aloes are to be dissolved, they are soaked in ten cubic centimeters of caustic soda at 40°, and to which ten cubic centimeters of water have been added, and at the ordinary boiling temperature three grammes of the flowers of sulphur are finally added, whereupon the combination will be immediately effected.

If, by means of the product obtained, which presents a grayish black shade, hanks of thread or cotton are colored, and the color then fixed with the bichromate of potash, the process being terminated by carbonate of soda in a boiling condition, a nice grayish lilac is obtained.

If the temperature would have been increased until desiccation would have set in, and even beyond, the product would no longer be grayish lilac, but a beautiful violet and brown, the deeper the longer the heat had been kept up, and the higher its degree. As, on the contrary, the temperature should be still more raised in order to produce the reaction in most cases, notably in the treatment of sawdust, of humus, bran, &c., it is advisable to introduce the articles to be transformed, with the solution of sulphureted alkalines, into covered sheet-metal vessels, in order to avoid ignition of the sulphureted-hydrogen gas, and to place such vessels into heating-chambers, where desiccation takes place at a degree necessary for the perfect combination of the elements. On these principles the proportions necessary for obtaining from oak-soil a beautiful brown tint may be stated as follows: Oak-soil, by which term I mean the top-soil or humus found under oak-trees, twenty grammes; sulphur, forty cubic centimeters. This mixture is dried in a heating-chamber at 210°, for the combination to take place.

The sulphur which we employ in this process, and which may be specially prepared for it, is composed of seventy cubic centimeters of soda at 40°, and of thirty grammes of the flowers of sulphur, added after combination with six cubic centimeters of water.

The products should be preserved in air and water tight cases. Whatsoever, therefore, the proportions employed for a given organic substance and of the sulphur may be, the mixture, being submitted to a progressive temperature, will form a combination, the commencement of which will be revealed by the disengagement of sulphureted hydrogen, the matter resulting constituting a coloring product with a shade proportionate to the proportions of matter and to the height and duration of the temperature to which the same was submitted. The same conditions of proportionality of matter and temperature will always reproduce a similar product, giving the same shade. The nature, style, and value of the shades, therefore, always depend on the will of the operator.

It is to be seen from the preceding that the combination is obtained either by first treating the substances by alkalies and then adding sulphur, or by directly treating them with alkaline sulphurets. It is therefore evident that every combination or process by which the matter to be transformed is brought in contact with sulphur, and of an alkaline, will be included in the method herein described.

Our coloring materials may be applied to all kinds of fabrics. For linen and silk, care must be taken to neutralize the hurtful excess of the alkaline by an acid, such as, for instance, acetic acid. The product may also be precipitated in water by an acid, as, for instance, by sulphuric acid, the precipitate being then collected, washed, and redissolved in slightly ammoniacal water, which cannot injure animal fiber.

Only the sulphurets and persulphurets have herein been described; but it is to be understood that the use of the congenerics of sulphur, notably bromine and iodine, will be equivalents thereof.

Indigenous substances which would otherwise be useless, and which can be purchased at a low price, may, by this process, be readily and at small expense transformed into valuable and efficient coloring materials. A number of ordinary dyes may by this process also be modified or changed by consolidating them.

I claim as my invention, and desire to secure by Letters Patent—

1. The process of converting organic substances into coloring matter, substantially as herein specified.

2. The process of modifying coloring matter for obtaining new tints, as set forth.

3. The combination of alkaline sulphurets or persulphurets, or of alkalines and sulphur, with organic substances, for converting them into coloring matter, as set forth.

LOUIS BRETONNIÉRE.

Witnesses:

FRED. HAYNES,
FRANK V. BRIESEN.